2,901,429

DRILLING FLUIDS

John K. Russell, Ste. Foy, Quebec, and Gerald J. Byrd, Sillery, Quebec, Canada, assignors to Lignosol Chemicals Limited, Quebec, Quebec, Canada No Drawing. Application April 17, 1956
Serial No. 578,603

5 Claims. (Cl. 252—8.5)

This invention relates to an improved drilling fluid for use in drilling oil and gas wells.

In the drilling of deep wells, as for example oil or gas wells, a drilling fluid is usually used. This fluid, which is pumped down the inside of the drill pipe and returns upward in the annulus between drill pipe and the hole, serves several purposes. It acts as a cooling medium and lubricant for the drill bit and as a medium for the transport of drill cuttings to the surface as well as producing a sealing layer on the wall of the hole. The fluid normally consists of a suspension in water of a swelling or hydrateable clay such as bentonite together with such clay or finely divided material as may be produced from the soil in the course of drilling. Other materials may also be added, such as weighting material where high pressures may be encountered, starches and gums to promote the wall sealing properties of the fluid as well as a number of other materials which are used to produce fluids for use under special conditions.

Because of its function in removing the cuttings from the hole it is necessary that the viscosity characteristics of the fluid should fall within a definite range. The viscosity of the fluid should be high enough to support the cuttings in their travel from the drill bit to the surface but should not be so high as to make circulation difficult and develop unduly high pressures in the pumping system. At the same time, the gel strength which develops on standing should be high enough to prevent settling of the cuttings in the well if circulation should be stopped for any reason but the gel should not develop fast enough to prevent the settling and removal of the cuttings in the mud pit. Further, the gel should not develop to a point where difficulties would be encountered on the resumption of pumping.

These requirements are often met when the mud is prepared with sodium base bentonite but under certain conditions, as for example when drilling through salt or anhydrite beds or when salt brine is encountered, flocculation of the sodium bentonite occurs and the viscosity of the mud increases to the point where it is difficult to maintain a normal pumping rate. Under these conditions, it has been found advantageous to convert the sodium bentonite to a calcium bentonite. This is done by adding sodium hydroxide and lime hydrate in amounts equal to about 2 and 5 lbs. per barrel of mud respectively. The immediate result of the addition of lime and sodium hydroxide is a sharp increase in the viscosity of the mud which may be so serious as to prevent adequate mixing. The viscosity drops on further agitation but in order to control the viscosity during the conversion period as well as to assure a satisfactory viscosity in the eventually obtained lime base mud, a dispersant or deflocculant is required.

Among the materials which have been recommended and used for this purpose, are quebracho and other tannin extracts, spent sulphite liquor and calcium lignosulphonate prepared by precipitation with lime from sulphite liquor. The tannin materials, such as quebracho, suffer from the disadvantage that while they give reasonably good viscosities on the lime base muds they do not give good resistance to contamination with sodium chloride and may even show an increase in viscosity at the higher level of dosage required to accommodate high levels of salt concentration. Spent sulphite liquor is relatively ineffectual. Viscosities are significantly higher than those found with quebracho and gel strengths both immediately after agitation and after being quiescent for 10 minutes are very high. High viscosities and particularly, high gel strengths are found after contamination with sodium chloride. The precipitated lignosulphonates are more satisfactory as regards viscosities and gel strengths both before and after contamination.

The object of the present invention is to provide a drilling fluid derived from spent or waste sulphite liquor and a clay suspension, which has stabilized and improved viscosity and gel strength, which characteristics enable it to serve the contemplated purpose more effectively than materials heretofore used.

In accordance with the invention, the spent sulphite liquid material, to be mixed with the clay suspension to form the drilling fluid, is subjected to oxidation with air or oxygen at temperature greater than its boiling point and under pressure corresponding to such temperature as now described in more detail.

Waste sulphite liquor, preferably having a solids content of substantially 50%, and a pH of 3.5 to 10 is heated at 125 to 165° C. in a closed vessel, under pressures corresponding to those temperatures, and air or oxygen is passed through the liquor at a rate of not less than 2 cubic feet per minute of free air per cubic foot of liquor. This treatment of the liquor is continued for one to four hours. The pH of the waste sulphite liquor may be adjusted with cations of calcium and magnesium in conjunction with calcium and magnesium base liquors respectively.

Best results are obtained when the pH of the liquor is adjusted within the range 7–9 and preferable 8.0–8.5. Treatment at below 125° C. promotes too high viscosity and gel strengths for good drilling fluids. The preferred temperature range is 140 to 150° C.

The following examples are illustrative of the invention and the effect of the treated spent sulphite liquor in a drilling fluid.

(1) Spent sulphite liquor containing about 50% total solids with a pH of about 3.5 was treated with sufficient calcium hydroxide to bring the pH to 8.0. The neutralized liquor was introduced to an autoclave and brought to a temperature of 150° C. At the same time air under a pressure of about 90 lbs./in.$^2$ was admitted at the rate of 3–4 ft.$^3$/min. The treatment was continued for 4 hours, sufficient steam being added to keep the temperature constant. Samples were withdrawn at hourly periods.

A suspension of sodium bentonite containing 7% solids was prepared and allowed to age for 18 hours. Four samples of 350 ml. each were taken from the stock suspension and after agitation with a high speed agitator for a period of 10 minutes were treated with the sulphite liquor—preparations described above.

The sulphite liquor was added in amounts sufficient to give in each case, 2 grams of solid material in each 350 ml. sample, care being taken to ensure equal dilution in each sample. After agitation for a further period of 10 minutes, 2 gms. sodium hydroxide and 5 gms. calcium hydroxide were added to each and the agitation continued for an additional 10 minutes. Viscosities and gel strengths were then determined using a Stormer Viscosimeter in accordance with the recommendations of the American Petroleum Institute. Following the viscosity measurements 7 gms. sodium chloride were added to each sample and after 10 minutes agitation the viscosities and gel strengths were again determined. The results are shown below along with those obtained on the addition of a similar amount of untreated sulphite liquor.

| Time of Treatment | Lime Base Mud | | | Salt Contaminated Mud | | |
|---|---|---|---|---|---|---|
| | Visc., Cp. | Gel Strength | | Visc., Cp. | Gel Strength | |
| | | Initial | 10 Min. | | Initial | 10 Min. |
| Untreated | 30 | 60 | 180 | 88 | 44 | 100 |
| 1 hour | 12 | 0 | 90 | 62 | 0 | 80 |
| 2 hours | 12 | 0 | 110 | 47 | 0 | 120 |
| 3 hours | 13 | 0 | 70 | 43 | 0 | 120 |
| 4 hours | 17 | 0 | 100 | 41 | 0 | 110 |

(2) An autoclave of about 450 gallon capacity was charged with about 200 gallons of lime base sulphite liquor, containing about 50% total solids, the pH of which has previously been adjusted to 8.5 by the addition of a water slurry of lime hydrate. Steam was added to the autoclave simultaneously to maintain a temperature of 150° C. and compressed air was added through a sparger at the rate of about 150 c.f.m. free air. Samples were withdrawn at hourly intervals and tests carried out as described above. The results are shown below

| Time of Treatment | Lime Base Mud | | | Salt Contaminated Mud | | |
|---|---|---|---|---|---|---|
| | Visc., Cp. | Gel Strength | | Visc., Cp. | Gel Strength | |
| | | Initial | 10 Min. | | Initial | 10 Min. |
| Untreated | 25 | 15 | 110 | 100 | 10 | 100 |
| 1 hour | 19 | 0 | 70 | 77 | 0 | 90 |
| 2 hours | 19 | 0 | 70 | 61 | 0 | 110 |
| 3 hours | 22 | 0 | 90 | 56 | 0 | 130 |

It will be observed that the treated sulphite liquor has the effect of reducing and substantially stabilizing the viscosity of the drilling fluid and at the same time of providing in the drilling fluid a gel strength which well adapts the drilling fluid for its purpose as indicated above.

It will be recognized that in use, the drilling fluid consists of the bentonite clay, the treated sulphite liquor dispersant and material taken up during the drilling of the hole. The sulphite liquor dispersant is added to the clay in the proportions of 2 to 6 pounds per barrel by drilling fluid.

In treating the mixture of clay and treated sulphite liquor 1 to 2 pounds of sodium hydroxide and 2 to 6 pounds of calcium hydroxide per barrel of the mixture are added, depending upon the amount of contamination encountered in drilling. This ensures the desired low viscosity.

It will be observed that the sulphite liquor used may have a calcium or magnesium base, although the former is preferred.

We claim:

1. A drilling fluid comprising bentonite and pretreated sulphite liquor mixed in aqueous dispersion with substantially 1 to 2 pounds of sodium hydroxide and substantially 2 to 6 pounds of calcium hydroxide per barrel of the mixture, said sulphite liquor being the product formed by adjusting the pH of waste sulphite liquor to 3.5–10, heating it at 125 to 165° C. under corresponding pressure and passing air into the hot liquor at the rate of not less than two cubic feet per minute per cubic foot of liquor for one to four hours.

2. A drilling fluid as defined in claim 1 wherein the pH of the waste sulphite liquor is adjusted to 8.0 to 8.5.

3. In a process of drilling a well wherein there is circulated in the well a mud-laden drilling fluid, the steps of controlling the viscosity of the drilling fluid by adding thereto the dispersing agent defined in claim 1 and circulating the drilling fluid in the well.

4. In a process of drilling a well wherein there is circulated in the well a mud-laden drilling fluid, the steps of controlling the viscosity of the drilling fluid by adding thereto as a dispersing agent concentrated waste sulphite liquor having a pH of 3.5 to 10 and oxidized at a temperature of substantially 125 to 165° C. by passing air therethrough at a rate of not substantially less than two cubic feet per minute per cubic foot of liquor for substantially one to four hours and circulating the drilling fluid in the well.

5. The process defined in claim 4 wherein the said waste sulphite liquor has a pH of 8 to 8.5 and is oxidized at a temperature of 140 to 150° C.

References Cited in the file of this patent
UNITED STATES PATENTS

| | | |
|---|---|---|
| Re. 18,268 | Howard | Dec. 1, 1931 |
| 2,109,858 | Cannon | Mar. 1, 1938 |
| 2,333,133 | Wayne | Nov. 2, 1943 |
| 2,491,436 | Barnes | Dec. 13, 1949 |
| 2,491,437 | Perkins | Dec. 13, 1949 |
| 2,674,575 | Lewis et al. | Apr. 6, 1954 |
| 2,698,233 | Lewis et al. | Dec. 28, 1954 |